United States Patent [19]

Heap et al.

[11] Patent Number: 5,317,723
[45] Date of Patent: May 31, 1994

[54] SYSTEM AND METHOD FOR AUTOMATICALLY RELOCATING AND CONFIGURING FIRMWARE STORED IN SUBSYSTEM MODULES

[75] Inventors: A. Randall Heap, Fremont; Eduardo A. Santiago, Woodside, both of Calif.

[73] Assignee: Digital Equipment Corporation, Maynard, Mass.

[21] Appl. No.: 39,503

[22] Filed: Mar. 29, 1993

Related U.S. Application Data

[63] Continuation of Ser. No. 438,717, Nov. 17, 1989, abandoned.

[51] Int. Cl.⁵ .................. G06F 9/00; G06F 9/445
[52] U.S. Cl. .................... 395/500; 395/700; 364/280; 364/280.2; 364/281.9; 364/DIG. 1; 364/245; 364/245.2
[58] Field of Search ............... 395/500, 375, 800, 700, 395/650, 425; 364/191–194

[56] References Cited

U.S. PATENT DOCUMENTS

| | | | |
|---|---|---|---|
| 4,138,738 | 2/1979 | Drogichen | 365/94 |
| 4,302,809 | 11/1981 | Drogichen | 364/200 |
| 4,589,063 | 5/1986 | Shah et al. | 395/275 |
| 4,636,940 | 1/1987 | Goodwin, Jr. | 395/700 |
| 4,706,213 | 10/1987 | Bondai | 364/200 |
| 4,734,854 | 3/1988 | Afshar | 364/200 |
| 4,791,558 | 12/1988 | Chaitin et al. | 395/500 |
| 4,833,604 | 5/1987 | Cheng et al. | 364/200 |
| 4,839,852 | 6/1989 | Knutsen | 364/900 |
| 4,914,576 | 3/1990 | Zelley et al. | 364/200 |
| 5,003,469 | 3/1991 | Kamiyama et al. | 364/200 |
| 5,029,078 | 7/1991 | Iwai | 364/200 |
| 5,050,068 | 9/1991 | Dollas et al. | 395/375 |

OTHER PUBLICATIONS

"Interface," No. 139 (Dec. 1988) pp. 167–170.
Nikkei Electronics, 1989 8.7 (No. 479); pp. 171–178. (no translated version available—written in Japanese).

Primary Examiner—Alyssa H. Bowler
Assistant Examiner—Alpesh M. Shah
Attorney, Agent, or Firm—Flehr, Hohbach, Test, Albritton & Herbert

[57] ABSTRACT

A system (30) can be configured with a plurality of subsystem modules (45a–45n), to tailor the system (30) to different requirements. CPU (32) is connected by a 32-bit, system bus (38) to a random access memory (RAM) (40), a cache (42) and an interface (44a) in graphics subsystem module (45a). Interface (44a) includes a module ROM (47a) containing firmware specific to such graphics subsystem modules. Similarly, each of the other subsystem modules (45b–45n) have interfaces (44b–44n) containing firmware specific to the particular type of module (45b–45n). The elements (32–42) of the system (30) comprise a base module (43), which is the same for all system configurations. A ROM (49) is provided in the base module (43), connected to the bus (38). The base module ROM (49) contains a software routine that locates all the option module ROMs (47a–47n) and, using the information in them creates a relocated version of the code in the option module ROMs (47a–47n) in the computer system's main memory (40). The relocated code will operate at any address in the computer's address space.

10 Claims, 3 Drawing Sheets

SYSTEM AND METHOD FOR AUTOMATICALLY RELOCATING AND CONFIGURING FIRMWARE STORED IN SUBSYSTEM MODULES

This is a continuation of application Ser. No. 07,438,717 filed Nov. 17, 1989, now abandoned.

BACKGROUND OF THE INVENTION

1. Field of the Invention

The present invention relates generally to a system and method which allows subsystem modules containing module specific firmware in read only memories (ROMs) to be connected in different configurations. More particularly, it relates to such a system and method which will allow the firmware to be copied to system memory locations that will vary depending on system configuration for execution.

2. Description of the Prior Art

Computer systems often are composed of multiple modules that may be connected in different configurations. This multiplicity of configurations allows the systems to be tailored for the problem at hand. In many system designs, module specific firmware is stored on each module in ROMs. This firmware is used for a variety of purposes, with diagnostic software and bootstrap software being most common.

ROM based firmware is normally stored in a form that is either executed directly or first copied to a fixed location in memory and executed there. In system architectures such as the MIPS R2000/R3000, the address where this code must be executed is fixed when it is placed in ROM. Since systems can be subsequently configured with an arbitrary collection of modules, it is very difficult to insure that the code from different modules does not have overlapping address ranges assigned to it. If the address ranges overlap, the system will not work. Nevertheless, simultaneous access to the code of multiple options is necessary to perform some firmware tasks. The problem is to provide a means to load and execute code stored in multiple option module ROMs. This problem is especially severe if a user is able to reconfigure his or her system with varying option modules according to needs after initial installation of the system.

It might be possible to store such code in absolute format, but copy it into random access memory (RAM) and inspect the copied code to determine which memory addresses referred to in the code need to be changed (relocated) to avoid overlapping address ranges, based solely on inspection of the code itself. However, any simple inspect and relocate algorithm tends to make mistakes. Therefore, unless the code is written in assembly language, this approach cannot be made to work in practice. Coding in assembly language is labor intensive and time consuming. The ability to use a higher level language, such as C, is desired.

Another known approach is to store code in a higher level language, such as FORTH, in ROM and use a FORTH interpreter on a base module of the system to interpret the code. This interpretive approach avoids the problem by storing the FORTH code in character format, and it need not contain any address specific information. However, FORTH and FORTH-like languages are poor languages to use for large software projects. For large projects, FORTH is difficult to understand and maintain.

Some computer systems, such as Digital Equipment Corporation's VAAX systems, when supported by the appropriate software tools, can generate position independent code. This is code that can be executed directly by the computer, but which contains little or no absolute address information. With such systems, the above problems can be avoided. However, such software tools are not available for all systems, especially newer systems.

SUMMARY OF THE INVENTION

A system for storing firmware in relocatable format in accordance with this invention has a host data processor. A system memory is connected to the host data processor by a bus, and a plurality of option subsystem modules are connected to the bus. Each of the plurality of option subsystem modules has an option module read only memory containing firmware specific to that one of the plurality of option subsystem modules. A base module read only memory is connected to the bus. The base module read only memory contains firmware for locating all of the option module read only memories and, using information in them, relocating an address independent version of the firmware in the option module read only memories in the system memory.

A method for storing firmware in relocatable format in accordance with this invention includes writing software source code. The software source code is compiled to produce compiled object code files. The compiled object code files are converted to a converted compiled object code format containing sufficient information to allow automatic relocation of the converted object code to operate at any address in a computer's memory. The converted object code is stored in a read only memory.

The attainment of the foregoing and related advantages and features of the invention should be more readily apparent to those skilled in the art, after review of the following more detailed description of the invention, taken together with the drawings, in which:

DETAILED DESCRIPTION OF THE INVENTION

Figure 1:
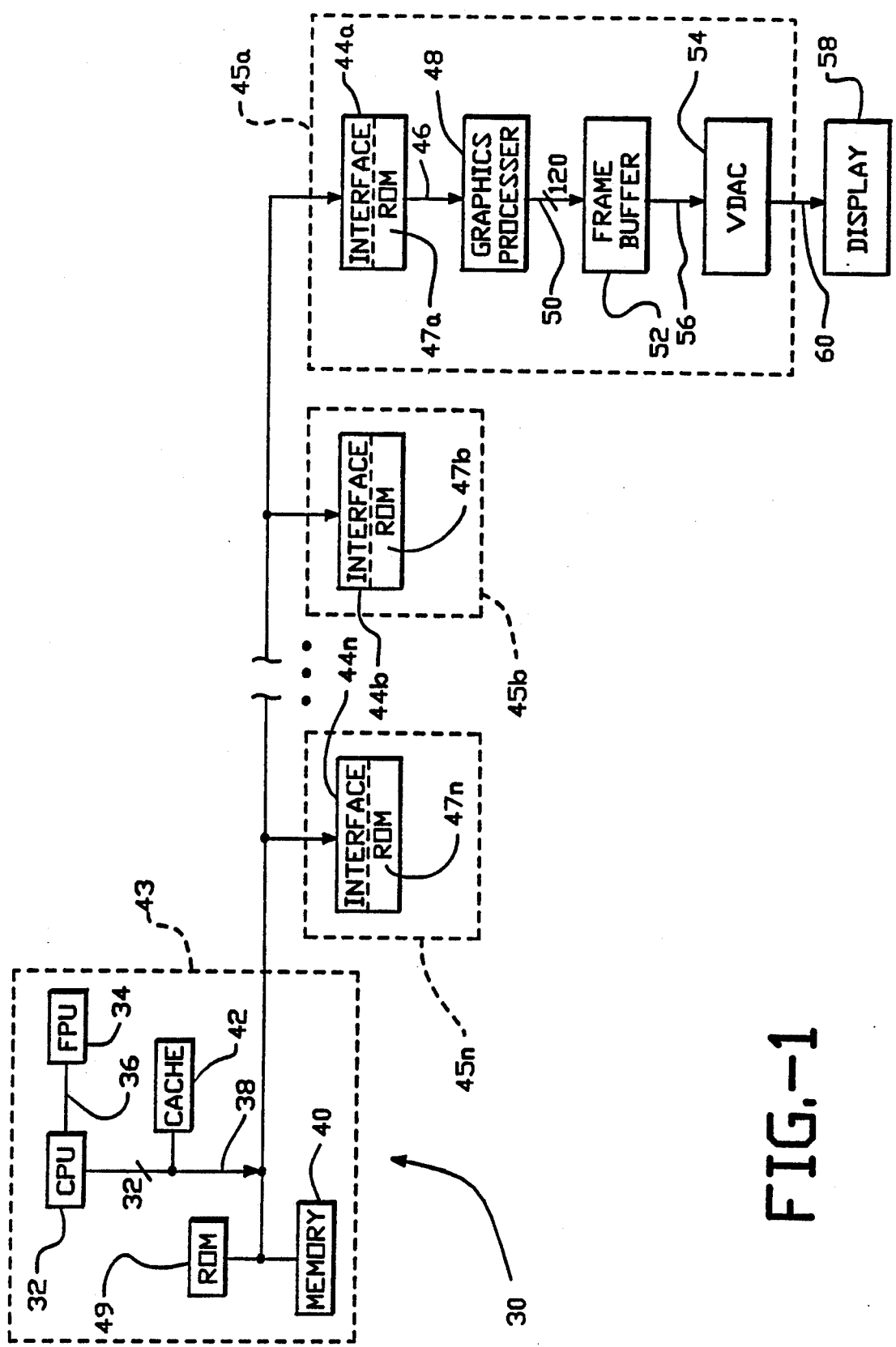
FIG. 1 is a block diagram of a computer system in which the present invention is used.

Turning now to the drawings, more particularly to FIG. 1, there is shown a system 30 that can be configured with a plurality of subsystem modules 45a through 45n, to tailor the system 30 to different requirements. A CPU 32 is connected to a floating point processor (FPU) 34 by bus 36. The CPU 32 is connected by a 32-bit system bus 38 to a random access memory (RAM) 40, a cache 42 and an interface 44a in graphics subsystem module 45a. The graphics subsystem module detail by way of example. The subsystem modules 45a–45n are implemented in known configurations, except as required for use of the present invention, as explained below. The interface 44a is connected by bus 46 to a graphics processor 48. Interface 44a includes a module ROM 47a containing firmware specific to such graphics subsystem modules. Similarly, each of the other subsystem modules 45b–45n contain interfaces 44b–44n containing firmware specific to the particular type of module 45b–45n. The graphics processor 48 is connected by 120-bit graphics bus 50 to frame buffer 52. The frame buffer 52 is connected to a video digital to analog converter (DAC) 54 by bus 56. The DAC 54 is connected to video display 58 by line 60.

The elements 32–42 of the system 30 comprise a base module 43, which is the same for all system configurations. A ROM 49 is provided in the base module 43, connected to the bus 38. The base module ROM 49 contains a software routine that locates all the option module ROMs 47a–47n and, using the information in them, creates a relocated version of the code in the option module ROMs 47a–47n in the computer system's main memory 40. If the modules 45b–45n include those of the type that might be used to load other software, such as a disk controller module, then its ROM 47b–47n also contains driver software that is used to operate the module 45b–45n for that purpose.

The system 30 configuration allows the user to reconfigure the system with varying option modules 45a–45n according to needs. The hardware and software characteristics of the system 30 would normally require that the contents of the ROMs 47a–47n be in absolute format as described above. However, this is unacceptable because the reconfigurability of the system 30 means that there is no way to know in advance what modules 45a–45n will be in the system. There is therefore no way to assign absolute address ranges so that any possible combination of module ROMs 47a–47n would never conflict.

The way of storing firmware in relocatable format of this invention allows the system 30 to accept any possible combination of module ROMs. This technique avoids the use of additional hardware complexity and takes advantage of other software tools already available. The ROMs 47a–47n do not contain the actual code that is executed by the system 30, but a specially formatted form of the code that contains not only the code itself, but enough information to allow the automatic relocation of the code to operate at any address in the system's address space in memory 40. To simplify the process, a representation format already supported by Digital Equipment Corporation's Ultrix operating system, namely the "a.out" format common to many UNIX systems, is employed. The use of a known representation format allows existing software tools to be used to prepare the ROM code.

Figure 2:
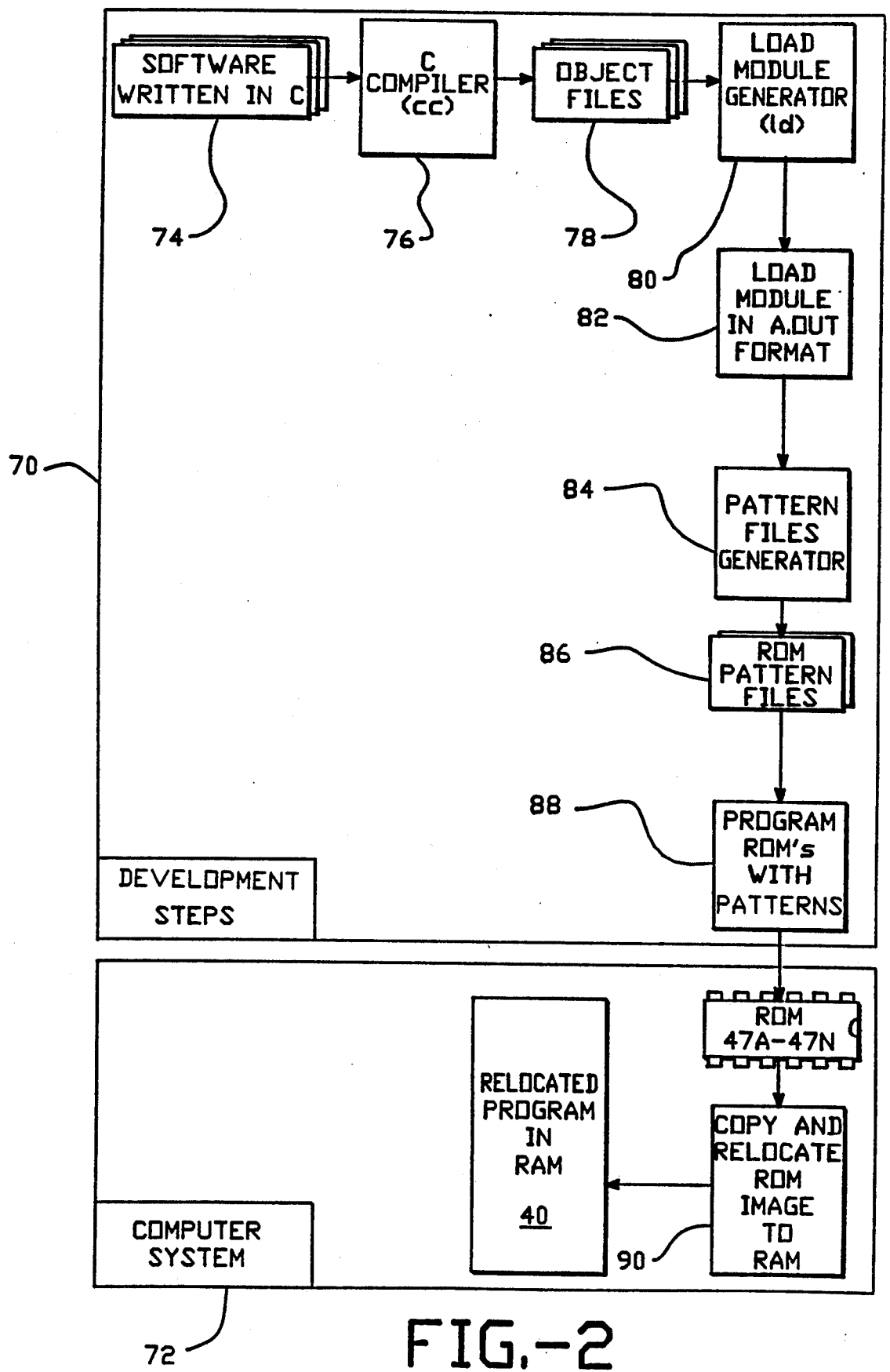
FIG. 2 is a combination flow chart and block diagram illustrating the invention.

The steps used to prepare the coded ROMs 47a–47n for the system 30 and their use in the system are shown respectively at 70 and 72 in FIG. 2. The ROM software is written in C, as indicated at 74 in the development steps 70. The C code is compiled at 76 to give object files 78. The object files 78 are supplied to a load module generator 80, which provides a load module 82 in a.out format. The load module 82 is supplied to a pattern files generator 84, which creates ROM pattern files 86. The ROM pattern files are used to program the ROMs 47a–47n at 88. The ROMs 47a–47n are then installed in the system 30, based on an initial desired configuration for the system 30. At power up of the system 30, the contents of the ROMs 47a–47n are copied and relocated at 90 into RAM 40.

Figure 3:
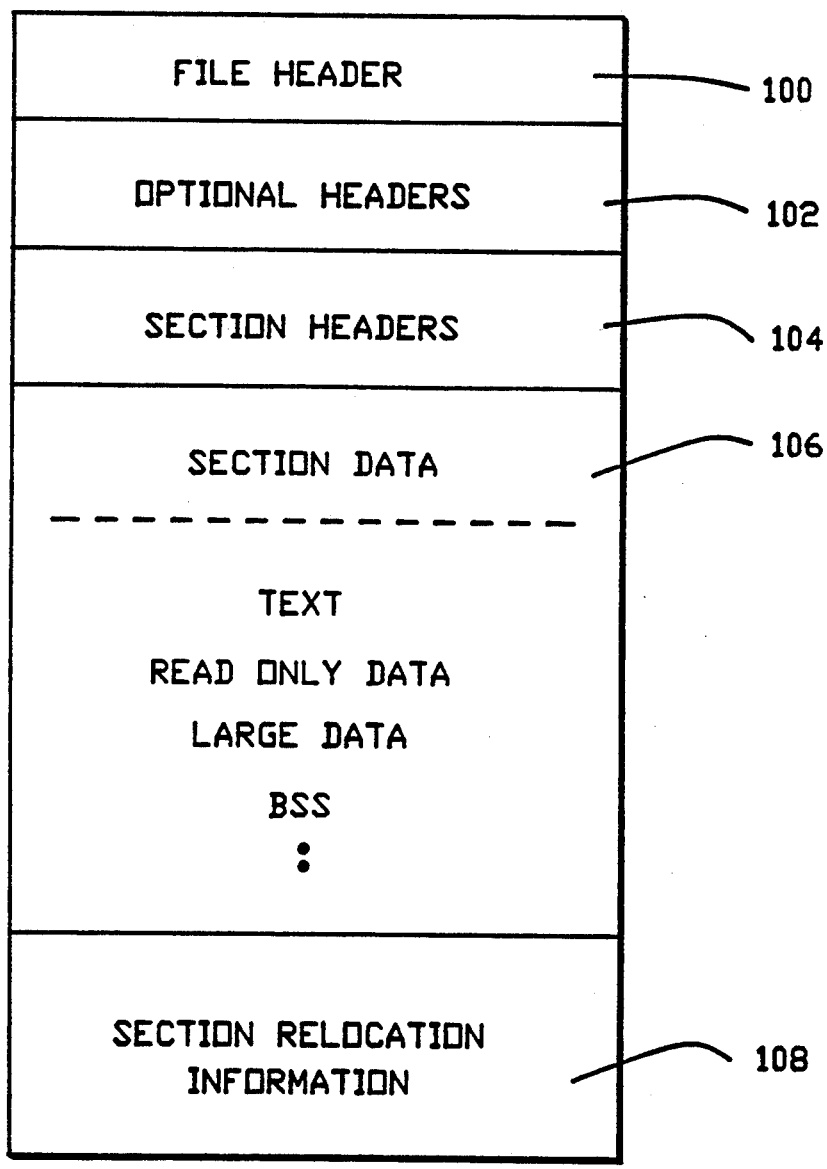
FIG. 3 is a more detailed block diagram of a portion of the block diagram in FIG. 2.

Details of the relocatable a.out format for the ROM code are shown in FIG. 3. The format includes a file header 100, optional headers 102 and section headers 104. Section data 106 is copied and relocated in RAM 40 using section relocation information 108 with the relocation routine in base module ROM 49. The procedure used to copy and relocate the code stored in the ROMs 47a–47n is shown below in Table I.

TABLE I

For each option module ROM 47a–47n perform the following:
Obtain the total size of the program text, data and bss sections from the section header 104.
Allocate a region of memory 40 of this size, and compute a corresponding relocation displacement.
Copy the unrelocated text and data sections from the ROM 47a–47n to this region of memory and set the bss section to zero.
For each of the text and data section 106 do the following:
For each relocation entry for the section 106 do the following:
Get the next relocation entry from the relocation data for this section.
Relocate the target memory cell as specified by the relocation data.

The procedure for relocating a memory cell in the system 30 is given in Table II below.

TABLE II

If the relocation type is "refword", add the relocation displacement to the memory cell.
If the relocation type is "jmpaddr", add the relocation displacement to the low 26 bits of the memory cell.
If the relocation type is "refhi", add the upper half of the relocation displacement to the low 16 bits of the memory cell.
If the relocation type is "reflo", add the lower half of the relocation displacement to the low 16 bits of the memory cell.

This procedure is easily generalized for other types of computer systems. The address of the memory cell to be relocated, and the relocation type are obtained from the relocation data portion of the file. The address of the memory cell to be relocated is relative to the beginning of the section.

It should further be apparent to those skilled in the art that various changes in form and details of the invention as shown and described may be made. It is intended that such changes be included within the spirit and scope of the claims appended hereto.

What is claimed is:

1. A computer system, comprising:
 a host data processor;
 a first memory, comprising a random access memory, coupled to said host data processor by a bus;
 a plurality of subsystem modules connected to said bus, wherein said plurality of subsystem modules are connectable to said bus in multiple different configurations;
 each of said plurality of subsystem modules including a respective read only memory (ROM) storing firmware specific to that one of said plurality of subsystem modules, said stored firmware in each subsystem module ROM including relocatable object code programs, and relocation data identifying memory cells in said relocatable object code programs whose value requires adjustment upon relocation of said relocatable object code programs, said relocation data including relocation type data specifying at least first, second and third types of value adjustments for respective ones of said identified memory cells in said relocatable object code programs; and
 a second memory coupled to said host data processor, said second memory storing an automatic reconfiguration program that is automatically executed by said host data processor whenever said computer is powered on; wherein said automatic reconfiguration program, when executed by said host data processor, allocates a region of said first memory to said relocatable object code programs in each said ROM, copies said relocatable object code programs from each said ROM into said allocated region of said first memory, retrieves said relocation data from said ROM in each of said subsystem modules, and adjusts the value of each memory cell in said copied object code programs identified by said relocation data in accordance with the predefined type of adjustment specified by said retrieved relocation data;

said automatic reconfiguration program including means, when executed by said host data processor, for adjusting the value of each said identified memory cell in said copied object code programs by performing one of at least first, second and third distinct, predefined mathematical operations that combines each said identified memory cell with a relocation displacement value, wherein which one of said at least first, second and third distinct, predefined mathematical operations is performed on each said identified memory cell is specified by said relocation type data.

2. The computer system of claim 1, said automatic reconfiguration program including means, when executed by said host data processor, for adjusting the value of each said identified memory cell in said copied object code programs by performing one of a predefined plurality of mathematical operations that combines each said identified memory cell with a relocation displacement value, wherein which one of said predefined plurality of mathematical operations is performed on each said identified memory cell is specified by said retrieved relocation data.

3. The computer system of claim 1, wherein said first, second and third distinct, predefined mathematical operations comprise, respectively, adding said relocation displacement value to said identified memory cell, adding a first portion of said relocation displacement value to said identified memory cell, and adding a second portion of said relocation displacement value to said identified memory cell.

4. The computer system of claim 1, wherein said second memory is a read only memory (ROM) coupled to said host data processor.

5. A computer system, comprising:

a host data processor;

a first, random access, memory coupled to said host data processor by a bus;

a plurality of subsystem modules connected to said bus, wherein said plurality of subsystem modules are connectable to said bus in multiple different configurations;

each of said plurality of subsystem modules including a read only memory (ROM) storing firmware specific to that one of said plurality of subsystem modules, said stored firmware in each subsystem module ROM including relocatable object code programs, header data specifying the size of said relocatable object code programs, and relocation data; said relocation data identifying memory cells in said relocatable object code programs whose value requires adjustment upon relocation of said relocatable object code programs, said relocation data including relocation type data specifying at least first, second and third types of value adjustments for respective ones of said identified memory cells in said relocatable object code programs; and a second memory coupled to said host data processor, said second memory storing an automatic reconfiguration program that is automatically executed by said host data processor whenever said computer is powered on or reset; wherein said automatic reconfiguration program, when executed by said host data processor, retrieves said header data in said ROM in each of said subsystem modules to determine the size of said relocatable object code programs in each said ROM, allocates regions of said first memory to said relocatable object code programs in accordance with said retrieve header data, copies said relocatable object code programs from said ROMs into said allocated regions of said first memory, retrieves said relocation data from said ROM in each of said subsystem modules, and adjusts the value of each memory cell in said copied object code programs identified by said relocation data in accordance with the predefined type of adjustment specified by said retrieved relocation data;

said automatic reconfiguration program including means, when executed by said host data processor, for adjusting the value of each said identified memory cell in said copied object code programs by performing one of at least first, second and third distinct, predefined mathematical operations that combines each said identified memory cell with a relocation displacement value, wherein which one of said at least first, second and third distinct, predefined mathematical operations is performed on each said identified memory cell is specified by said relocation type data.

6. The computer system of claim 5, said automatic reconfiguration program including means, when executed by said host data processor, for adjusting the value of each said identified memory cell in said copied object code programs by performing one of a predefined plurality of mathematical operations that combines each said identified memory cell with a relocation displacement value, wherein which one of said predefined plurality of mathematical operations is performed one each said identified memory cell is specified by said retrieved relocation data.

7. The computer system of claim 5, wherein said first, second and third distinct, predefined mathematical operations comprise, respectively, adding said relocation displacement value to said identified memory cell, adding a first portion of said relocation displacement value to said identified memory cell, and adding a second portion of said relocation displacement value to said identified memory cell.

8. The computer system of claim 5, wherein said second memory is a read only memory (ROM) coupled to said host data processor.

9. In a computer system having a host data processor, a first memory, comprising a random access memory, coupled to said host data processor by a bus, and a plurality of subsystem modules connected to said bus; a method of configuring relocatable object code programs for controlling said plurality of subsystem modules, comprising the steps of:

storing in a read only memory (ROM) in each of said plurality of subsystem modules firmware specific to that one of said plurality of subsystem modules, said stored firmware in each subsystem module ROM including relocatable object code programs, and relocation data identifying memory cells in said relocatable object code programs whose value requires adjustment upon relocation of said relocatable object code programs, said relocation data including relocation type data specifying at least first, second and third types of value adjustments for respective ones of said identified memory cells in said relocatable object code programs; and upon powering on said computer system, performing the steps of:

allocating a region of said first memory to said relocatable object code programs in each said ROM;

copying said relocatable object code programs from each said ROM into said allocated region of said first memory;

retrieving said relocation data from each said ROM in each of said subsystem modules; and adjusting the value of each memory cell in said copied object code programs identified by said relocation data by performing on each said memory cell the one of said at least two predefined distinct mathematical operations specified by said retrieved relocation data;

said adjusting step including performing one of at least first, second and third distinct, predefined mathematical operations that combines each said identified memory cell with a relocation displacement value, wherein which one of said at least first, second and third distinct, predefined mathematical operations is performed on each said identified memory cell is specified by said relocation type data.

10. The method of claim 9, wherein said first, second and third distinct, predefined mathematical operations comprise, respectively, adding said relocation displacement value to said identified memory cell, adding a first portion of said relocation displacement value to said identified memory cell, and adding a second portion of said relocation displacement value to said identified memory cell.

* * * * *

UNITED STATES PATENT AND TRADEMARK OFFICE
CERTIFICATE OF CORRECTION

PATENT NO. : 5,317,723
DATED : May 31, 1994
INVENTOR(S) : A. Randall Heap et al.

It is certified that error appears in the above-identified patent and that said Letters Patent is hereby corrected as shown below:

Column 6,
Line 45, delete "one" and insert therefor -- on --

Signed and Sealed this

Twenty-first Day of June, 2005

JON W. DUDAS
*Director of the United States Patent and Trademark Office*